United States Patent [19]

Fujita et al.

[11] 4,092,457

[45] May 30, 1978

[54] METHOD FOR THE PRODUCTION OF A SYNTHETIC FIBER PAPER HAVING AN IMPROVED PRINTABILITY FOR OFFSET PRINTING AND THE PRODUCT THEREOF

[75] Inventors: Seigoro Fujita; Tojiro Kitahori, both of Amagasaki, Japan

[73] Assignee: Kanzaki Paper Manufacturing Co., Ltd., Tokyo, Japan

[21] Appl. No.: 658,925

[22] Filed: Feb. 18, 1976

Related U.S. Application Data

[63] Continuation-in-part of Ser. No. 452,841, Mar. 20, 1974, abandoned.

[30] Foreign Application Priority Data

Mar. 24, 1973 Japan .................................. 48-33696

[51] Int. Cl.² ........................ B32B 27/32; B32B 27/00

[52] U.S. Cl. .................................... 428/341; 162/135; 162/137; 162/168 R; 162/168 N; 162/168 NA; 162/169; 162/181 A; 162/181 B; 428/511; 428/512; 428/513; 428/514; 428/515; 428/516; 428/517; 428/518; 428/519; 428/520; 428/521; 428/522; 428/523; 428/342; 427/407 R

[58] Field of Search ............... 428/513, 517, 219, 507, 428/511, 512, 514–516, 518–523, 532, 537, 341, 342, 457, 461, 464, 500, 539; 162/137, 184, 168 R, 168 N, 168 NA, 181 B, 181 D, 181 A, 135, 169; 427/180, 407, 411, 419

[56] References Cited

U.S. PATENT DOCUMENTS

| | | | |
|---|---|---|---|
| 3,504,072 | 3/1970 | Ploetz et al. | 162/184 |
| 3,560,417 | 2/1971 | Pizzi et al. | 117/155 UA |
| 3,592,730 | 7/1971 | Newman | 162/184 |
| 3,723,169 | 3/1973 | Guastella et al. | 427/179 |
| 3,770,856 | 11/1973 | Veki et al. | 264/13 |
| 3,787,256 | 1/1974 | Nowotny | 162/146 |
| 3,850,672 | 11/1974 | Tani et al. | 117/76 R |

OTHER PUBLICATIONS

"Chemical Engineering", 3-8-71, pp. 62 and 64.

*Primary Examiner*—Ralph S. Kendall
*Assistant Examiner*—Bruce H. Hess
*Attorney, Agent, or Firm*—Armstrong, Nikaido, Marmelstein & Kubovcik

[57] ABSTRACT

The surface of a paper material is treated with an aqueous composition comprising a water soluble polymer and a polymer emulsion, said paper material being formed of a fibrous material, at least a part of which is composed of hydrophilic polyolefin fibers. The obtained product has a strong pick resistance and an improved ink receptivity adapted for offset printing.

20 Claims, No Drawings

METHOD FOR THE PRODUCTION OF A SYNTHETIC FIBER PAPER HAVING AN IMPROVED PRINTABILITY FOR OFFSET PRINTING AND THE PRODUCT THEREOF

CROSS REFERENCE TO RELATED APPLICATION

This application is a continuation-in-part of our earlier application Ser. No. 452,841 filed Mar. 20, 1974 now abandoned.

BACKGROUND OF THE INVENTION

This invention relates to an improved synthetic fiber paper formed of a fibrous material, at least a part of which is composed of polyolefin fibers, and more particularly to a synthetic fiber paper having a good printability for offset printing. This invention also relates to methods for production of such improved synthetic fiber paper.

The sheet material formed of a fibrous material which is composed solely of polyolefin fibers or composed of a mixture of polyolefin fibers and natural cellulose fibers is advantageous in that it has a good water resistance, a chemical resistance and a dimensional stability, while it is disadvantageous for poor offset printability in comparison with a paper sheet formed solely of cellulose fibers.

As known to those skilled in the art, in the offset printing process it is impossible or extremely difficult to apply fountain solution and printing ink separately. It is also known that failure of transfer of printing ink is often caused due to poor absorption of fountain solution by the sheet to be printed thereon.

Generally, a pick resistance of the sheet formed of polyolefin fibers is not strong enough for offset printing because the internal bonding between polyolefin fibers in the sheet are not so strong. One of the effective methods for improving the pick resistance is to treat the sheet with an aqueous solution of adhesive in any of known manners such as tub sizing, surface sizing, coating, etc. However, application of the adhesive solution in an amount enough to obtain a good pick resistance prevents absorption of fountain solution with the result that transfer of printing ink to the paper surface is failed. This phenomenon is seen more remarkably as the polyolefin fiber content in the sheet is increased. Even with a sheet material containing polyolefin fibers in an amount of about 5% by weight with respect to that of cellulose fibers, so-called "snow flaking" is produced on the surface area where polyolefin fibers are exposed.

The primary object of this invention is to provide an improved synthetic fiber paper in which the abovementioned disadvantages can be avoided. Particularly one of the objects of the invention is to provide a synthetic fiber paper formed of a fibrous material, at least a part of which is composed of polyolefin fibers, in which "pick resistance" and "offset printability" are improved.

Another object of this invention is to provide an economical and effective method for treatment to improve the printability of synthetic fiber paper formed of a fibrous material, at least a part of which is composed of polyolefin fibers.

Other objects and advantages of the invention will be partly apparent and partly discussed in detail hereinbelow.

SUMMARY OF THE INVENTION

The synthetic fiber paper having an improved printability for offset printing according to the invention is produced by subjecting a surface of a sheet material formed of a fibrous material, at least a part of which is composed of polyolefin fibers containing a hydrophilic component therein, to a treatment with an aqueous composition comprising a water soluble polymer and an aqueous polymer emulsion.

The sheet material may be formed either solely of polyolefin fibers of the kind described or of a combination of polyolefin fibers of the kind described with natural cellulose fibers.

In a preferred embodiment of the invention, the aqueous composition further includes at least one salt or oxide of a polyvalent metal.

DETAILED DESCRIPTION OF THE INVENTION

The synthetic fiber paper according to this invention is formed of a fibrous material, at least a part of which is composed of polyolefin fibers containing a hydrophilic component therein. That is, the synthetic fiber paper useful for this invention is a sheet material which may be formed either solely of polyolefin fibers of the kind described or of a mixture of polyolefin fibers of the kind described with natural cellulose fibers and/or with another synthetic fibers.

Among polyolefins for the polyolefin fibers there are included homopolymers obtained by polymerization of olefin monomers such as ethylene, propylene, 4-methylpentene-1, butene-1, styrene and copolymers of these olefins. Copolymers obtained by polymerization of these olefins with at least one other copolymerizable monomer are also included thereamong.

As examples of the hydrophilic components to be incorporated to polyolefins there are included hydrophilic or water-soluble polymers such as polyvinyl alcohol, polyacrylamid, polyethylene oxide, polyethylene glycol and carboximethyl cellulose as well as random, graft or block copolymers having vinyl monomer units which have a hydrophilic group therein or to which a hydrophilic group can be introduced by after-treatment such as hydrolysis. The hydrophilic polymer includes as well copolymers of olefin with a vinyl monomer having a hydrophilic group in itself or a vinyl monomer to which a hydrophilic group can be introduced by proper after-treatment. Among the vinyl monomers which have a hydrophilic group or which can take a hydrophilic group therein by a proper treatment, there may be included vinyl acetate, acrylic acid, methacrylic acid, methyl acrylate, methylmethacrylate, acrylamid, allyl alcohol and butene-tri-carboxylic acid.

The hydrophilic component may be incorporated to polyolefin by polymer-blending and/or graft-copolymerization.

By incorporation of the hydrophilic component the paper making ability of the polyolefin fibers is improved so that synthetic fiber paper having a homogenous fibrous structure. The composition ratio by weight between the hydrophilic component and the polyolefin in the fibrous material is preferably within the range of 1 : 99 to 40 : 60, more preferably of 5 : 95 to 30 : 70.

The reason why such the range like this is preferred is because use of the hydrophilic component in an excess amount results in producing the fibers having a poor water resistance and a poor dimensional stability.

The above mentioned polymers may be spun by any of flush spinning, melt spinning, uniaxial stretching and splitting, solution shearing, emulsion flush spinning to produce fibrous material. Among these techniques the emulsion flush spinning method, the flush spinning method and the solution shearing method are preferable and the emulsion flush spinning method is most preferable.

The emulsion flush spinning technique is, per se, known, for example, as disclosed in U.S. Pat. No. 3,808,091. According to the emulsion flush spinning technique, the fibrous material is produced by the steps of admixing a polyolefin incorporating a hydrophilic component by blend and/or graft polymerization, a solvent for the polyolefin such as hydrocarbons or chlorinated hydrocarbons and a non-solvent with a surface active agent to prepare an admixture, heating the admixture under strong agitation to prepare a heated emulsion in which the polyolefin is dissolved, and ejecting the heated emulsion under high pressure through an orifice.

The flush spinning method and the solution shearing method are, per se, known, for example, as disclosed in U.S. Pat. No. 3,081,519, German Pat. No. 2,058,386 and British patent specification No. 868,651.

The fibrous material obtained by any of the abovementioned methods may be subjected to bearing and/or refining, if required.

The fibrous material containing a hydrophilic component thus obtained has a large specific surface area and can be suspended well in water and have a good self-bonding property.

As already described before, the synthetic fiber paper useful for the invention may be not only a sheet material formed solely of polyolefin fibers of the kind described, but also that formed of a mixture of polyolefin fibers of the kind described with natural cellulose fibers and/or another synthetic fibers. Of course the sheet material can contain, as additives, inorganic fillers, sizing agents, deforming agents, dyes, adhesives, etc. The amount of natural cellulose fibers to be mixed with polyolefin fibers is not particularly limited. However, the natural cellulose fibers should not be mixed in such an amount that the advantageous properties of polyolefin fibers are deteriorated. The amount of cellulose fibers, when used, should be within the range of 95 to 10% by weight. Accordingly the amount of polyolefin fibers may be within the range of 5 to 90% by weight. The above mentioned synthetic fiber paper useful for this invention is hereinafter referred to as "polyolefin fiber paper".

According to this invention, the polyolefin fiber paper is treated with an aqueous composition essentially comprising a water soluble polymer and an aqueous polymer emulsion. The aqueous composition is applied to the polyolefin fiber paper by any of the known proper methods such as tub sizing, surface sizing, spraying, coating, etc. Addition of the aqueous composition to a suspension of fibers in the step of beater sizing before the sheet forming will not result in the desired effect.

Useful water soluble polymers for this invention are natural or synthetic water soluble high molecular weight compounds such as protein, starch, cellulose ethers, alginates, polyvinyl alcohol, gum arabic, polyacrylamid, hydrolysis products of styrene-anhydrous maleic acid copolymer, hydrolysis products of olefin-anhydrous maleic acid copolymer, etc. These polymers may be used in the form of a mixture.

Useful aqueous emulsions of high molecular weight polymers may be emulsions produced by the emulsion or suspension polymerization of at least one monomer having an active double bond such as vinyl acetate, acrylic ester, methacrylic ester, acrylonitrile, ethylene, propylene, butadiene, styrene, vinyl chloride, vinylidene chloride, chloroprene, etc.

Preferably, the aqueous polymer emulsion may be an aqueous emulsion of a homopolymer or copolymer by emulsion or suspension polymerization of a. 20 to 100 parts by weight of an aliphatic hydrocarbon monomer selected from the group consisting of ethylene, propylene and butadiene; and b. 0 to 80 parts by weight of at least one $\alpha$-substituted olefinic monomer having a polar substituent said $\alpha$-substituted olefinic monomer being selected from the group consisting of vinyl acetate, acrylic ester, methacrylic ester, acrylonitrile, styrene, vinyl chloride, vinylidene chloride and chloroprene.

The composition ratio of the above (a) monomer to the above (b) monomer in the copolymer may be varied at will within the above range in accordance with the combination of monomers used. More preferably, the copolymer is prepared by emulsion or suspension polymerization of 30 to 80% by weight of said (a) monomer and 70 to 20% by weight of said (b) monomer.

Among the useful homopolymers there may be included polyethylene, polypropyrene and polybutadiene. Among the useful copolymers there are included ethylene-vinyl acetate, ethylene-vinylacetate-methacrylic ester, ethylene-acrylonitrile, ethylene-vinylidene chloride, propylene-acrylonitrile, butadiene-acrylic ester, butadiene-metacrylic ester, butadiene-acrylic ester-methacrylic ester, butadiene-acrylonitrile, butadiene-styrene, butadiene-vinyl chloride, butadiene-vinylidene chloride and butadiene-chloroprene. The most preferred copolymers are ethylene-vinyl acetate, butadiene-acrylonitrile, butadiene-methacrylic ester and butadiene-styrene. Acrylic esters and methacrylic esters among the above copolymers may preferably be alkyl esters of which the alkyl has 1 to 3 carbon atoms.

In order to control the adhesive property and the viscosity of the emulsion and the ink receptivity of the product paper, such unsaturated carboxylic acid monomers as acrylic acid, methacrylic acid, crotonic acid, itaconic acid, maleic acid and fumaric acid may be added and copolymerized with the before mentioned (a) and (b) material monomers. The amount of such unsaturated carboxylic acid monomer should however be 5% by weight or less with respect to the total amount of the material monomers.

It is desirable that the above emulsions are selected from those that can form a film at a normal temperature for drying a paper, for example, at a temperature within the range of 80° – 150° C. These emulsions can also be used in the form of a mixture.

The preferable mixing ratio of the water soluble polymer and the aqueous polymer emulsion is within the range of 90 : 10 to 10 : 90% solid by weight, and in view of the adhesion strength and water absorption the mixing ratio is most preferably within the range of 75 : 25 to 20 : 80.

The exact reason why the water absorption of polyolefin fiber paper can be improved according to the invention is yet unknown but it has confirmed that the desired effect cannot be achieved by treating the surface of the polyolefin fiber paper either with a water soluble polymer alone or an aqueous polymer emulsion alone. It may be considered that the continuous or discontinuous film formed by a mixture of the water soluble polymer with the aqueous polymer emulsion is porous enough for absorbing fountain solution because of the difference in the film forming ability between the water soluble polymer and the aqueous polymer emulsion.

The above aqueous composition may further contain at least one polyvalent metal salt and/or polyvalent metal oxide so that the fountain solution absorbability may further be improved.

Useful metals for polyvalent metal salts and oxides are, for example, magnesium, calcium, zinc, cadmium, barium, alminum, zirconium, tin, lead chromium, vanadium, manganese, iron, cobalt, nickel, etc.

These polyvalent metal salts and oxides may be used in the form of a mixture thereof. The preferable examples are $ZnO$, $Zn(OH)_2$, $ZnCl_2$, $ZnSO_4$, $Zr(NO_3)_2$, $Al_2O_3$, $Al(OH)_3$, $AlCl_3$, $NaAl(SO_4)_2$, $Al(CH_3COO)_3$, $SnO_2$, $Na_2SnO_3$, $SnCl_4$, $Na_2SnCl_6$, $SnSO_4$, $MgO$, $Mg(OH)_2$, $MgCl_2$, $Mg(NO_3)_2$, $Mg_3(PO_4)_2$, $Zr(CH_3COO)_2$, $Ca(OH)_2$, $CaCl_2$, $CaSO_4$, $Ca(CH_3COO)_2$ and $CaCO_3$. Among the useful polyvalent metal salts and oxides for this invention, water soluble salts and oxides are most preferred because the effect can be achieved with use of relatively small amount thereof. The polyvalent metal salts and oxides should be added in an amount of at least 0.1% solid by weight of the total amount by solid weight of the water soluble polymer and the aqueous polymer emulsion contained in the aqueous composition. The most preferable range of the amount of the polyvalent metal salts or oxides is 0.1 to 50% solid by weight of the total amount by solid weight of the water soluble polymer and the aqueous polymer emulsion.

The effective amount of the aqueous composition to be applied to the polyolefin fiber paper is at least $0.3 g/m^2$ on dry basis, whether or not it includes any polyvalent metal salt or oxide. The upper limit is considered only in economical view, and therefore the most preferable treating amount is within the range of 0.3 to $10 g/m^2$ on dry basis.

The polyolefin fiber paper according to the invention has an improved pick resistance and is effectively absorptive of fountain solution and accordingly it finds its most usefulness in offset printing.

The surface of the polyolefin fiber paper may further be overcoated with a pigment coating composition to obtain an improved pigment coated paper. In pigment coated papers it is generally known that in order to avoid failure of printing ink transfer in the offset printing due to poor absorption at the pigment coated surface such a heavy coating as in an amount of at least $20 g/m^2$ on a dry basis is required. However, if the polyolefin fiber paper treated according to the invention is utilized as a base sheet for the pigment coated paper, the amount of the pigment coating composition to be applied can be remarkably reduced to an extent far less than $20 g/m^2$ on a dry basis without sacrificing the water absorbability. This will be a great advantage because a light weight pigment coated polyolefin fiber paper which is bulky and sufficiently opaque can be produced.

PREFERRED EMBODIMENTS OF THE INVENTION

The following examples are given in order to illustrate the invention without limiting the same. Unless otherwise indicated, the part is shown by weight on dry basis.

EXAMPLE 1

90 parts of isotactic polypropylene powder ($\eta$ = 1.8 dl/g) and 10 parts of polyvinyl alcohol powder (polymerization degree : 1400, saponification value : 99%) were mixed together in a mixer and the mixture was extruded at 230° C to obtain a pellet. 170g of the obtained pellet was introduced into an autoclave together with 1.25 lit. of methylene chloride, 2 lit. of water and 6g of sodium dodecyl benzene sulfonate. The mixture in the autoclave was heated with stirring to obtain an emulsion. When the temperature of the emulsion was risen up to 145° C, it was flushed out from the nozzle of 1.6mm in diameter at the bottom of the autoclave to obtain polyolefin synthetic pulp. The obtained pulp was made into a 1% aqueous suspension, which was in turn refined by SPROUT WALDRON disk refiner. A pulp suspension comprising 30 parts NBKP (bleached softwood kraft pulp, CSF 420 cc), 40 parts of LBKP (bleached hardwood kraft pulp, CSF 400cc) and 30 parts of the above polyolefin synthetic pulp was prepared. And thereafter 0.7 parts of rosin size and 2.5 parts of alminium sulfate were added thereto. A paper sheet of $50 g/m^2$ on dry basis from the resultant pulp suspension was obtained by a laboratory fourdrinier paper machine.

The obtained sheet was treated at its surface with various aqueous compositions as shown in Table 1 by a size press and thus treated paper sheet was dried at about 110° C and then calendered. The treated paper sheet was tested for the pick resistance and the offset printability.

The test of pick resistance was carried out with use of an IGT printability tester according to TAPPI STD T-499, SN-64 (ink tack value 13.2, spring A, pressure 35 kg). The test of offset printability was carried out with use of a two color offset printing machine (ROLAND REKORD TYPE:RZKIIIb, made in Germany) to observe ink receptivity.

The test results are as given in Table 1. All the treated sheet that had a pick resistance of 80cm/sec or less when measured by IGT printability tester produced "picking" in the offset printability test by ROLAND offset printing machine.

Table 1

| | Test No. | Treating Agent in Aqueous Composition | Mixing Ratio of Treating Agent (% on dry basis) | Treated Amount $g/m^2$ | Pick Resistance IGT cm/sec | Ink Receptivity |
|---|---|---|---|---|---|---|
| Control | 1 | Non-treated | — | — | 35 | — |
| | 2 | a) Aqueous solution of polyvinyl alcohol (completely saponified) | 100 | 2.40 | 203 | x |
| | 3 | b) Aqueous solution of oxidized starch | 100 | 2.35 | 156 | x |
| | 4 | c) Aqueous solution of kasein | 100 | 2.36 | 184 | x |
| | 5 | d) Aqueous solution of Styrene-maleic anhydride (50:50)copolymer | 100 | 2.34 | 176 | x |

Table 1-continued

| | Test No. | Treating Agent in Aqueous Composition | Mixing Ratio of Treating Agent (% on dry basis) | Treated Amount $g/m^2$ | Pick Resistance IGT cm/sec | Ink Receptivity |
|---|---|---|---|---|---|---|
| | 6 | e) Acrylonitrile - butadiene (50:50)copolymer emulsion | 100 | 2.30 | 40 | — |
| | 7 | f) Vinyl acetate - ethylene (50:50)copolymer emulsion | 100 | 2.35 | 45 | — |
| | 8 | g) Methyl metacrylate-butadiene (50:50) copolymer emulsion | 100 | 2.40 | 48 | — |
| | 9 | h) Styrene-butadiene-acrylic acid (49:49:2) copolymer emulsion | 100 | 2.37 | 53 | — |
| Example | 10 | a) + e) | 50:50 | 2.40 | 163 | o |
| | 11 | a) + f) | 50:50 | 2.38 | 167 | o |
| | 12 | a) + g) | 50:50 | 2.37 | 171 | o |
| | 13 | a) + h) | 50:50 | 2.35 | 175 | o |
| | 14 | b) + e) | 50:50 | 2.37 | 125 | o |
| | 15 | b) + f) | 50:50 | 2.35 | 113 | o |
| | 16 | b) + g) | 50:50 | 2.38 | 120 | o |
| | 17 | b) + h) | 50:50 | 2.40 | 126 | o |
| | 18 | c) + e) | 50:50 | 2.41 | 151 | o |
| | 19 | c) + f) | 50:50 | 2.35 | 145 | o |
| | 20 | c) + g) | 50:50 | 2.36 | 148 | o |
| | 21 | c) + h) | 50:50 | 2.38 | 155 | o |
| | 22 | d) + e) | 50:50 | 2.40 | 143 | o |
| | 23 | d) + f) | 50:50 | 2.39 | 138 | o |
| | 24 | d) + g) | 50:50 | 2.37 | 139 | o |
| | 25 | d) + h) | 50:50 | 2.35 | 147 | o |
| | 26 | a) + e) + $CrSO_4$ | 49.5:49.5:1 | 2.31 | 165 | ◎ |
| | 27 | a) + f) + $ZnCl_2$ + $NH_4OH$ | 49.5:49.5:1 | 2.41 | 163 | ◎ |
| | 28 | a) + f) + ZnO + $NH_4OH$ | 48.5:48.5:3 | 2.40 | 168 | ◎ |
| | 29 | a) + f) + $CdCl_2$ | 49.5:49.5:1 | 2.38 | 160 | ◎ |
| | 30 | a) + g) + $AlCl_3$ + $NH_4OH$ | 49.5:49.5:1 | 2.33 | 175 | ◎ |
| | 31 | a) + h) + $COCl_2$ + $NH_4OH$ | 49.5:49.5:1 | 2.35 | 173 | ◎ |
| | 32 | b) + e) + ZnO + $NH_4OH$ | 48.5:48.5:3 | 2.37 | 120 | ◎ |
| | 33 | b) + h) + $ZnCl_2$ + $NH_4OH$ | 49.5:49.5:1 | 2.46 | 124 | ◎ |
| | 34 | c) + f) + $ZnCl_2$ + $NH_4OH$ | 49.5:49.5:1 | 2.31 | 135 | ◎ |
| | 35 | c) + g) + $Zr(CH_3COO)_2$ | 49.5:49.5:1 | 2.35 | 140 | ◎ |
| | 36 | c) + h) + MgO | 48.5:48.5:3 | 2.43 | 151 | ◎ |
| | 37 | d) + g) + $CaSO_4$ | 49.5:49.5:1 | 2.40 | 130 | ◎ |
| | 38 | d) + h) + $FeCl_3$ + $NH_4OH$ | 49.5:49.5:1 | 2.36 | 141 | ◎ |

NOTE: The evaluation of the ink receptivity (transfer ability of printing ink) is shown according to the following marks:
x: Practically undesirable failure of printing ink transfer was observed.
o: Practically allowable failure of printing ink transfer was observed.
◎ : Good receptivity was observed.
—: Unable to evaluate because of picking.

EXAMPLE 2

80 parts of isotactic polypropylene powder ($\eta$ = 2.3 dl/g), 20 parts of polyethylene powder (HI-ZEX 2100LP, manufactured by MITSUI PETROCHEMICAL INDS., LTD.), 12 parts of polyvinyl alcohol powder (GOSENOL NM-14, manufactured by NIHON SYNTHETIC, CHEMICAL IND. CO., LTD.) and 10 parts of calcium sulfate were mixed together in a mixer and thereafter the mixture was extruted at 230° C to obtain a pellet. 170g of the obtained pellet was introduced into an autoclave together with 1.25 lit. of methylene chloride, 2 lit. of water and 6g of sodium dodecylbenzene sulfonate. The mixture in the autoclave was heated with stirring to obtain an emulsion. When heated up to 145° C, the emulsion was flushed out from the nozzle of 1.6 mm in diameter at the bottom of the autoclave to obtain polyolefin pulp.

Thus obtained pulp was made into a 1% aqueous suspension, which was refined by the SPROUT WALDRON disk refiner. On the other hand a cellulose pulp suspension comprising 20 parts of NBKP (CSF 420 cc) and 80 parts of LBKP (CSF 400cc) was prepared. The above polyolefin pulp and natural cellulose pulp were mixed in the various ratios as shown in Table 2 and paper sheets of $50g/m^2$ were produced from the above-obtained pulp mixtures according to JIS P-8290 (Japan Industrial Standard P-8290). The sheets thus obtained were treated by means of size press with various aqueous compositions as shown in Table 2. Thus treated sheets were dried with a cylinder dryer of 105° C, and thereafter were calendered.

Each sheet obtained was tested for the pick resistance and the offset printability. The test results are as given in Table 2.

Table 2

| | | Mixing Ratio of Pulp (%) | | | | | | |
|---|---|---|---|---|---|---|---|---|
| | Test No. | Cellulose Pulp | Poliolefin Pulp | Treating Agent in Aqueous Composition | Mixing Ratio of Treating Agents (% on dry basis) | Treated Amount ($g/m^2$) | Pick Resistance IGT (cm/sec) | Ink Receptivity |
| Control | 39 | 90 | 10 | — | — | — | 70 | — |
| | 40 | 75 | 25 | — | — | — | 60 | — |
| | 41 | 50 | 50 | — | — | — | 53 | — |
| | 42 | 25 | 75 | — | — | — | 44 | — |
| | 43 | 0 | 100 | — | — | — | 35 | — |
| | 44 | 90 | 10 | Aqueous solution of polyvinyl alcohol | 100 | 1.40 | 305 | x |
| | 45 | 75 | 25 | " | " | 1.37 | 254 | x |
| | 46 | 50 | 50 | " | " | 1.35 | 217 | x |
| | 47 | 25 | 75 | " | " | 1.38 | 180 | x |
| | 48 | 0 | 100 | " | " | 1.36 | 153 | x |

Table 2-continued

| | Test No. | Mixing Ratio of Pulp (%) Cellulose Pulp | Poliolefin Pulp | Treating Agent in Aqueous Composition | Mixing Ratio of Treating Agents (% on dry basis) | Treated Amount ($g/m^2$) | Pick Resistance IGT (cm/sec) | Ink Receptivity |
|---|---|---|---|---|---|---|---|---|
| Example | 49 | 90 | 10 | Aqueous solution of polyvinyl alcohol + emulsion of vinyl acetate —ethylene (40:60)copolymer | 75:25 | 1.39 | 284 | ◎ |
| | 50 | 75 | 25 | " | 50:50 | 1.37 | 213 | ◎ |
| | 51 | 50 | 50 | " | " | 1.40 | 186 | o |
| | 52 | 25 | 75 | " | " | 0.71 | 135 | o |
| | 53 | 0 | 100 | " | 25:75 | 0.71 | 116 | o |
| | 54 | 90 | 10 | Aqueous solution of polyvinyl acetate + emulsion of vinyl acetate — ethylene (40:60) copolymer + (ZnO + $NH_4OH$) | 72.5:22.5:5 | 1.40 | 280 | ◎ |
| | 55 | 75 | 25 | " | 47.5:47.5:5 | 1.38 | 208 | ◎ |
| | 56 | 50 | 50 | Aqueous solution of polyvinyl alcohol + emulsion of vinyl acetate — ethylene (40:60) copolymer + (Zn + $NH_4OH$) | 47.5:47.5:5 | 1.36 | 177 | ◎ |
| | 57 | 25 | 75 | " | " | 1.39 | 150 | o |
| | 58 | 0 | 100 | " | 24:71:5 | 0.72 | 118 | o |

EXAMPLE 3

Commercially available polyethylene pulp (SWP. manufactured by MITSUI ZELLEBRACH CO., LTD.) was made into a 1% aqueous dispersion, which was then refined by the SPROUT WALDRON disk refiner. The cellulose pulp in Example 2 and the above polyethylene pulp were mixed together in various ratios as shown in Table 3, and paper sheets were produced in the same manner as described in Example 2. The obtained sheets were treated by means of size press with various aqueous compositions as shown in Table 3. Each treated sheet was examined in the same manner as described in Example 1 for the pick resistance and the offset printability. The results are as given in Table 3.

EXAMPLE 4

Commercially available polypropylene pulp (DAN PULP, manufactured by UBE-NITTO KASEI IND., CO., LTD.) was made into a 1% aqueous dispersion, which was then refined by the SPROUT WALDRON disk refiner. The cellulose pulp in Example 2 and the above polypropylene pulp were mixed together in various ratios as shown in Table 4, and paper sheets were produced in the same way as described in Example 2. The obtained sheets were treated with various aqueous compositions as given in Table 4 by blade coating method. Each treated sheet was examined in the same manner as described in Example 1 for the pick resistance and the offset printability. The results are as given in Table 4.

Table 3

| | Test No. | Mixing Ratio of Pulp (%) Cellulose Pulp | Polyolefin Pulp | Treating Agent in Aqueous Composition | Mixing Ratio of Treating Agents(% on dry basis) | Treated Amount ($g/m^2$) | Pick Resistance IGT (cm/sec) | Ink Receptivity |
|---|---|---|---|---|---|---|---|---|
| Control | 59 | 90 | 10 | — | — | — | 50 | — |
| | 60 | 75 | 25 | — | — | — | 35 | — |
| | 61 | 50 | 50 | — | — | — | <30 | — |
| | 62 | 25 | 75 | — | — | — | <30 | — |
| | 63 | 0 | 100 | — | — | — | <30 | — |
| | 64 | 90 | 10 | Aqueous solution of polyvinyl alcohol | 100 | 2.41 | 231 | x |
| | 65 | 75 | 25 | " | " | 2.37 | 190 | x |
| | 66 | 50 | 50 | " | " | 2.38 | 163 | x |
| | 67 | 25 | 75 | " | " | 2.40 | 145 | x |
| | 68 | 0 | 100 | " | " | 2.36 | 136 | x |
| Example | 69 | 90 | 10 | Aqueous solution of polyvinyl alcohol + emulsion of vinyl acetate — ethylene (30:70) copolymer | 75:25 | 2.35 | 206 | ◎ |
| | 70 | 75 | 25 | " | 50:50 | 2.38 | 156 | ◎ |
| | 71 | 50 | 50 | " | " | 2.40 | 137 | o |
| | 72 | 25 | 75 | " | " | 2.40 | 115 | o |
| | 73 | 0 | 100 | " | 25:75 | 1.38 | 108 | o |
| | 74 | 90 | 10 | Aqueous solution of polyvinyl alcohol + emulsion of vinyl acetate — ethylene (30:70) copolymer + (ZnO + $NH_4OH$) | 72.5:22.5:5 | 2.35 | 201 | ◎ |
| | 75 | 75 | 25 | " | 47.5:47.5:5 | 2.35 | 158 | ◎ |
| | 76 | 50 | 50 | Aqueous solution of polyvinyl alcohol + emulsion of vinyl acetate — ethylene (30:70) copolymer + (ZnO + $NH_4OH$) | 47.5:47.5:5 | 2.40 | 130 | ◎ |
| | 77 | 25 | 75 | " | " | 2.37 | 118 | o |
| | 78 | 0 | 100 | " | 24:71:5 | 1.36 | 105 | o |

Table 4

| | Test No. | Mixing Ratio of Pulp (%) Cellulose Pulp | Polyolefin Pulp | Treating Agent in Aqueous Composition | Mixing Ratio of Treating Agents(% on dry basis) | Treated Amount (g/m²) | Pick Resistance IGT (cm/sec) | Ink Receptivity |
|---|---|---|---|---|---|---|---|---|
| Control | 79 | 90 | 10 | — | — | — | 53 | — |
| | 80 | 75 | 25 | — | — | — | <30 | — |
| | 81 | 50 | 50 | — | — | — | <30 | — |
| | 82 | 25 | 75 | — | — | — | <30 | — |
| | 83 | 0 | 100 | — | — | — | <30 | — |
| | 84 | 90 | 10 | Aqueous solution of polyvinyl alcohol | 100 | 4.31 | 226 | x |
| | 85 | 75 | 25 | " | " | 4.36 | 190 | x |
| | 86 | 50 | 50 | " | " | 4.35 | 163 | x |
| | 87 | 25 | 75 | " | " | 4.37 | 138 | x |
| | 88 | 0 | 100 | " | " | 4.37 | 120 | x |
| Example | 89 | 90 | 10 | Aqueous solution of polyvinyl alcohol + emulsion of vinyl acetate — ethylene (50:50) copolymer | 75:25 | 4.35 | 209 | ◎ |
| | 90 | 75 | 25 | " | 50:50 | 4.40 | 173 | ◎ |
| | 91 | 50 | 50 | " | " | 4.38 | 151 | o |
| | 92 | 25 | 75 | " | " | 4.38 | 120 | o |
| | 93 | 0 | 100 | " | 25:75 | 4.36 | 108 | o |
| | 94 | 90 | 10 | Aqueous solution of polyvinyl alcohol + emulsion of vinyl acetate — ethylene (50:50) copolymer + (ZnO + $NH_4OH$) | 72.5:22.5:5 | 4.40 | 213 | ◎ |
| | 95 | 75 | 25 | " | 47.5:47.5:5 | 4.34 | 175 | ◎ |
| | 96 | 50 | 50 | " | " | 4.37 | 160 | ◎ |
| | 97 | 25 | 75 | " | " | 4.38 | 123 | o |
| | 98 | 0 | 100 | " | 24:71:5 | 4.36 | 111 | o |

EXAMPLE 5

A pigment coating composition was prepared according to the following prescription:

| | Parts by weight on dry basis |
|---|---|
| No. 1 grade kaolin | 80 |
| Calcium carbonate | 20 |
| T.S.P.P. 0.4 | |
| Casein | 7 |
| Styrene-butadiene latex(50% solid) | 13 |

The above pigment coating composition was applied in an amount of 10g/m² on dry basis onto the treated surface of polyolefin fiber paper obtained in Test Nos. 1-25 (Table 1) of Example 1 and the coated paper was super-calendered.

The obtained pigment coated paper sheet was tested by the same method as in Example 1 for the pick resistance and the offset printability. The results are as given in Table 5.

In Table 5, the test No. 1' indicates a test on the coated paper obtained by applying the above pigment coating composition onto the sheet obtained in the test No. 1. Others also indicate likewise.

Table 5

| | Test No | Pick Resistance IGT (cm/sec) | Ink Receptivity |
|---|---|---|---|
| Control | 1' | <30 | — |
| | 2' | 163 | x |
| | 3' | 131 | x |
| | 4' | 154 | x |
| | 5' | 142 | x |
| | 6' | <30 | — |
| | 7' | <30 | — |
| | 8' | <30 | — |

Table 5-continued

| | Test No | Pick Resistance IGT (cm/sec) | Ink Receptivity |
|---|---|---|---|
| | 9' | <30 | — |
| Example | 10' | 141 | ◎ |
| | 11' | 145 | ◎ |
| | 12' | 148 | ◎ |
| | 13' | 150 | ◎ |
| | 14' | 104 | ◎ |
| | 15' | 98 | ◎ |
| | 16' | 108 | ◎ |
| | 17' | 108 | ◎ |
| | 18' | 133 | ◎ |
| | 19' | 128 | ◎ |
| | 20' | 129 | ◎ |
| | 21' | 136 | ◎ |
| | 22' | 126 | ◎ |
| | 23' | 119 | ◎ |
| | 24' | 122 | ◎ |
| | 25' | 129 | ◎ |

EXAMPLE 6

Polyolefin synthetic pulp was manufactured in the same manner as disclosed in Example 1 except utilizing 95 parts of high density polyethylene (Melt index by ASTMD 1238: 6.0 g/10 min) as polyolefin, 5 parts of polyvinyl alcohol (polymerization degree:1400 and saponification value : 99%) as the hydrophilic component and hexan as the solvent. Then paper sheet is manufactured from the obtained pulp in the same manner as disclosed in Example 1.

The obtained sheet was treated at its surface with various aqueous compositions as shown in Table 6 by a size press and thus treated sheet was dried at about 105° C and then calendered.

Each sheet obtained was tested for the pick resistance and the offset printability. The test results are as given in Table 6.

Table 6

| | Test No. | Treating Agent in Aqueous Composition | Copolymerization Ratio of Emulsion Methyl-methacrylate | Butadiene | Mixing Ratio of Treating Agent (% on dry basis) | Treated Amount (g/m²) | Pick Resistance IGT (cm/sec) | Ink Receptivity |
|---|---|---|---|---|---|---|---|---|
| Example | 99 | Aqueous solution of polyvinyl alcohol + emulsion | 100 | 0 | 50:50 | 1.23 | 70 | |

Table 6-continued

| Test No. | Treating Agent in Aqueous Composition | Copolymerization Ratio of Emulsion Methyl-methacrylate | Butadiene | Mixing Ratio of Treating Agent (% on dry basis) | Treated Amount ($g/m^2$) | Pick Resistance IGT (cm/sec) | Ink Receptivity |
|---|---|---|---|---|---|---|---|
| | of methylmethacrylate-butadiene copolymer | | | | | | |
| 100 | " | 80 | 20 | " | 1.14 | 102 | |
| 101 | " | 60 | 40 | " | 1.15 | 110 | |
| 102 | " | 40 | 60 | " | 1.20 | 125 | |
| 103 | " | 20 | 80 | " | 1.35 | 143 | |
| 104 | " | 0 | 100 | " | 1.31 | 150 | |

What we claim is:

1. A method for the production of a synthetic fiber paper having improved printability for offset printing which comprises coating a sheet material formed of a fibrous material wherein a. the fibrous material is prepared from materials selected from the group consisting of polyolefin fibers containing a hydrophilic component therein and a mixture of polyolefin fibers containing a hydrophilic component therein and natural cellulose fibers, and b. the coating being applied to the fibrous material in an amount of at least 0.3 $g/m^2$ on a dry basis and being an aqueous composition consisting essentially of a water soluble polymer and an aqueous polymer emulsion, said emulsion being an aqueous emulsion of a copolymer prepared by the emulsion or suspension polymerization of i. 30 to 80% by weight of an aliphatic hydrocarbon monomer selected from the group consisting of ethylene, propylene and butadiene; and ii. 70 to 20% by weight of at least one α-substituted olefinic monomer having a polar substituent, said α-substituted olefinic monomer being selected from the group consisting of vinyl acetate, acrylic ester, methacrylic ester, acrylonitrile, styrene, vinyl chloride, vinylidene chloride and chloroprene, and the ratio of water soluble polymer to aqueous polymer emulsion being in the range of from 90:10 to 10:90% by weight solids.

2. A method for the production of a synthetic fiber paper as defined in claim 1, in which said fibrous material is composed solely of polyolefin fibers containing a hydrophilic component therein.

3. A method for the production of a synthetic fiber paper as defined in claim 1, in which said fibrous material is composed of a combination of 90 to 5% by weight of polyolefin fibers containing a hydrophilic component therein with 10 to 95% by weight of natural cellulose fibers.

4. A method for the production of a synthetic fiber paper as defined in claim 1, in which said water soluble polymer is a member selected from the group consisting of protein, starch, cellulose ethers, alginates, polyvinyl alcohol, polyacrylamid, gum arabic, hydrolysis products of styrene-anhydrous maleic acid copolymer, hydrolysis products of α-olefin-anhydrous maleic acid copolymer and mixtures of the foregoing.

5. A method for the production of a synthetic fiber paper as defined in claim 1, in which said copolymer is prepared by emulsion or suspension polymerization of said aliphatic hydrocarbon monomer, said α-substituted olefinic monomer and an unsaturated carboxylic acid monomer, the amount of said unsaturated carboxylic acid monomer being 5% by weight or less of the total amount of the material monomers.

6. A method for the production of a synthetic fiber paper as defined in claim 5, in which said unsaturated carboxylic acid monomer is a member selected from the group consisting of acrylic acid, methacrylic acid, crotonic acid, itaconic acid, maleic acid and fumaric acid.

7. A method for the production of a synthetic fiber paper as defined in claim 1, in which said aqueous composition consists essentially of 75 to 20% solid by weight of a water soluble polymer and 25 to 80% solid by weight of an aqueous polymer emulsion.

8. A method for the production of a synthetic fiber paper as defined in claim 1, in which said aqueous composition further includes at least one salt or oxide of a polyvalent metal selected from the group consisting of magnesium, calcium, zinc, cadmium, barium, alminum, zirconium, tin, lead, chromium, vanadium, manganese, iron, cobalt and nickel, said salt or oxide being present in the aqueous composition in an amount from 0.1 to 50 parts by weight with respect to 100 parts by weight solids of the total amount of said water soluble polymer and said aqueous polymer emulsion.

9. A method for the production of a synthetic fiber paper as defined in claim 8, in which said salt or oxide of a polyvalent metal is water soluble.

10. A method for the production of a synthetic fiber paper as defined in claim 1, in which said surface of said sheet material is further overcoated with a pigment coating composition comprising pigment and an adhesive.

11. A synthetic fiber paper having an improved printability for offset printing which comprises a. a sheet of material formed from a fibrous material, at least a part of which is composed of polyolefin fibers, said fibrous material being selected from the group consisting of polyolefin fibers containing a hydrophilic component therein and a mixture of polyolefin fibers containing a hydrophilic component therein and natural cellulose fibers, and b. a surface of the sheet material having coated thereon an aqueous composition, said coating being present on the sheet in an amount of at least 0.3 $g/m^2$ on a dry basis and the aqueous composition consisting essentially of a water soluble polymer and an aqueous polymer emulsion, said emulsion being an aqueous emulsion of a copolymer prepared by the emulsion or suspension polymerization of i. 30 to 80% by weight of an aliphatic hydrocarbon monomer selected from the group consisting of ethylene, propylene and butadiene; and ii. 70 to 20% by weight of at least one α-substituted olefinic monomer having a polymer substituent, said α-substituted olefin monomer being selected from the group consisting of vinyl acetate, acrylic ester, methacrylic ester, acrylonitrile, styrene, vinyl chloride, vinylidene chloride and chloroprene, and the ratio of water soluble polymer to aqueous polymer emulsion being in the range of from 90:10 to 10:90% by weight solids.

12. A synthetic fiber paper as defined in claim 11, in which said fibrous material is composed solely of polyolefin fibers containing a hydrophilic component therein.

13. A synthetic fiber paper as defined in claim 11, in which said fibrous material is composed of a combination of 90 to 5% by weight of polyolefin fibers containing a hydrophilic component therein with 10 to 95% by weight of natrual cellulose fibers.

14. A synthetic fiber paper as defined in claim 11, in which said water soluble polymer is a member selected from the group consisting of protein, starch, cellulose ethers, alginates, polyvinyl alcohol, polyacrylamid, gum arabic, hydrolysis products of styrene-anhydrous maleic acid copolymer, hydrolysis products of $\alpha$-olefin-anhydrous maleic acid copolymer and mixtures of the foregoing.

15. A synthetic fiber paper as defined in claim 11, in which said copolymer is prepared by emulsion or suspension polymerization of said aliphatic hydrocarbon monomer, said $\alpha$-substituted olefinic monomer and an unsaturated carboxylic acid monomer, the amount of said unsaturated carboxylic acid monomer being 5% by weight or less of the total amount of the material monomers.

16. A synthetic fiber paper as defined in claim 15, in which said unsaturated carboxylic acid monomer is a member selected from the group consisting of acrylic acid, methacrylic acid, crotonic acid, itaconic acid, maleic acid and fumaric acid.

17. A synthetic fiber paper as defined in claim 11, in which said aqueous composition consists essentially of 75 to 20% solid by weight of a water soluble polymer and 25 to 80% solid by weight of an aqueous polymer emulsion.

18. A synthetic fiber paper as defined in claim 11 in which said aqueous composition further includes at least one salt or oxide of a polyvalent metal selected from the group consisting of magnesium, calcium, zinc, cadmium, barium, alminum, zirconium, tin, lead, chromium, vanadium, manganese, iron, cobalt and nickel, said salt or oxide being present in the aqueous composition in an amount from 0.1 to 50 parts by weight with respect to 100 parts by weight solids of the total amount of said water soluble polymer and said aqueous polymer emulsion.

19. A synthetic fiber paper as defined in claim 18 in which said salt or oxide of a polyvalent metal is water soluble.

20. A synthetic fiber paper as defined in claim 11, in which said surface of said sheet material is further overcoated with a pigment coating composition comprising pigment and an adhesive.

* * * * *